(12) United States Patent
Grechanik et al.

(10) Patent No.: US 8,972,874 B2
(45) Date of Patent: *Mar. 3, 2015

(54) GRAPHICAL USER INTERFACE TYPING AND MAPPING SYSTEM

(75) Inventors: Mark Grechanik, Chicago, IL (US); Qing Xie, Chicago, IL (US); Chen Fu, Downers Grove, IL (US)

(73) Assignee: Accenture Global Services Limited, Dublin (IE)

( * ) Notice: Subject to any disclaimer, the term of this patent is extended or adjusted under 35 U.S.C. 154(b) by 483 days.

This patent is subject to a terminal disclaimer.

(21) Appl. No.: 13/356,356

(22) Filed: Jan. 23, 2012

(65) Prior Publication Data

US 2012/0124494 A1 May 17, 2012

Related U.S. Application Data

(63) Continuation of application No. 12/038,658, filed on Feb. 27, 2008, now Pat. No. 8,132,114.

(51) Int. Cl.
| | | |
|---|---|---|
| G06F 3/14 | (2006.01) | |
| G06F 11/36 | (2006.01) | |
| G06F 9/44 | (2006.01) | |
| G06Q 30/02 | (2012.01) | |

(52) U.S. Cl.
CPC .............. G06F 11/3696 (2013.01); G06F 8/38 (2013.01); G06F 11/368 (2013.01); G06Q 30/0283 (2013.01)
USPC ........... 715/762; 717/109; 717/136; 717/168; 717/173; 709/204; 719/313; 719/320; 705/400; 702/20

(58) Field of Classification Search
CPC ..................................... G06F 3/14; G06F 3/17
USPC .......... 715/200–277, 700–867; 700/701–866; 709/201–229; 705/50–79; 345/30–111
See application file for complete search history.

(56) References Cited

U.S. PATENT DOCUMENTS

| | | | |
|---|---|---|---|
| 6,898,764 B2 | 5/2005 | Kemp | |
| 6,990,654 B2 * | 1/2006 | Carroll, Jr. | 717/109 |
| 7,165,240 B2 | 1/2007 | Patterson | |
| 7,546,602 B2 * | 6/2009 | Hejlsberg et al. | 719/313 |
| 7,716,662 B2 * | 5/2010 | Seiden | 717/173 |
| 2003/0236775 A1 | 12/2003 | Patterson | |
| 2004/0002818 A1 * | 1/2004 | Kulp et al. | 702/20 |
| 2006/0015847 A1 * | 1/2006 | Carroll, Jr. | 717/109 |
| 2006/0168577 A1 * | 7/2006 | Melo et al. | 717/168 |
| 2007/0143398 A1 * | 6/2007 | Graham | 709/204 |
| 2007/0271203 A1 * | 11/2007 | Delvat | 705/400 |
| 2009/0217250 A1 * | 8/2009 | Grechanik et al. | 717/136 |
| 2009/0217302 A1 * | 8/2009 | Grechanik et al. | 719/320 |

OTHER PUBLICATIONS

First Examination Report in related application in India, Application No. 430/MUM/2009, dated Sep. 19, 2013; Government of India Patent Office; pp. 1-3.

* cited by examiner

*Primary Examiner* — Ruay Ho
(74) *Attorney, Agent, or Firm* — Brinks Gilson & Lione

(57) ABSTRACT

A graphical user interface (GUI) type model helps application designers create error free graphical user interface applications (GAPs). The GUI type model provides a reference set of GUI element types. The application designer assigns a selected GUI element type to each GUI element in a GAP design. The GUI element types help ensure consistent and proper treatment of the GUI element types at every stage in the development of the application, from initial planning and design, to compilation and execution.

20 Claims, 10 Drawing Sheets

GRAPHICAL USER INTERFACE TYPING AND MAPPING SYSTEM

CROSS-REFERENCE

This application is a Continuation application of U.S. application Ser. No. 12/038,658 filed Feb. 27, 2008, which is hereby incorporated by reference.

TECHNICAL FIELD

This application relates to graphical user interfaces. In particular, this application relates to facilitating testing and validation of graphical user interfaces.

BACKGROUND

The relentless pace of advancing technology has given rise to complex computer software applications that assist with almost every aspect of day-to-day life. These applications exist in virtually every field, such as analyzing radio telescope signals for signs of intelligent life among the stars, finding new oil deposits under the earth, and designing new automobiles. One nearly ubiquitous feature of these applications is that they employ graphical user interfaces (GUIs). Another nearly ubiquitous aspect of GUI applications (GAPs) is that they are complex, difficult to design, and difficult to debug.

In the past it has generally been easier to implement the GUI to the application than to thoroughly test the GAP logic. For GAPs of any significant complexity, the permutations and combinations of GUI elements give rise to an enormous field of potential interactions with GUI elements, other GAPs, and logic execution that could have bugs of any severity, from insignificant to critical failure. Exacerbating the problem is that application developers are under pressure to continually add new features, update the GUI, and release new versions of applications.

Manually testing large-scale enterprise GAPs is tedious, error prone, and laborious. Nontrivial GAPs contain hundreds of GUI screens that in turn contain thousands of GUI elements. In order to automate testing of GAPs, test engineers write programs using scripting languages (e.g., JavaScript and VBScript), and these testing scripts drive GAPs through different states by mimicking users who interact with the GAP by performing actions on the GAP GUI objects.

Notably, these testing procedures operate on the GAP after it has been designed, built, and is in executable form. During the design of the GAP, however, little guidance was available to the designer for how to build and debug the GAP itself. In an effort to provide some level of documentation, designers sometimes generated a wireframe model of the GUI and attached informal notations to elements in the model. However, this ad-hoc approach translated into faulty GAPs at run time, particularly when the GAP had more than minimal complexity.

Therefore, a need exists to address the problems noted above and other previously encountered.

SUMMARY

A GUI typing and mapping system employs a graphical user interface (GUI) type model that helps application designers create error free graphical user interface applications (GAPs). The GUI type model provides a formal reference set of GUI element types. The application designer assigns a selected GUI element type to GUI elements in a GAP design. The GUI element types help ensure consistent and proper treatment of the GUI element types at every stage in the development of the application, from initial planning and design, to compilation and execution. The application designer may also specify mappings of GUI elements between the current GAP version and the subsequent GAP version. The mappings aid future analysis and transformation of a current test script for application to the subsequent GAP version. The resulting GUI element type mappings and GUI element version mappings may be communicated to a GUI element metadata repository or other downstream processing systems.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

Figure 1:
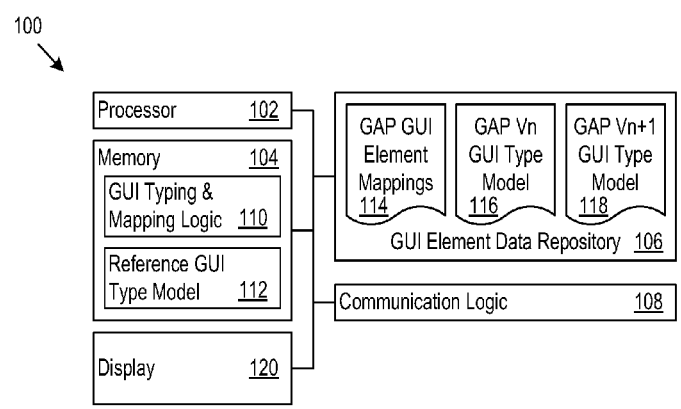
FIG. 1 shows a GUI element typing and mapping system.

FIG. 1 shows a graphical user interface (GUI) element typing and mapping system ("system") 100. The system 100 includes a processor 102, a memory 104, and a GUI element data repository ("repository") 106. The system 100 exchanges information with other systems through the communication logic 108. The communication logic 108 may be a wireline/wireless interface, interprocess communication mechanism, shared memory, Web Services interface, or any other types of communication interface.

FIG. 1 shows a graphical user interface (GUI) element typing and mapping system ("system") 100. The system 100 includes a processor 102, a memory 104, and a GUI element data repository ("repository") 106. The system 100 exchanges information with other systems through the communication logic 108. The communication logic 108 may be a wireline/wireless interface, interprocess communication mechanism, shared memory, Web Services interface, or any other types of communication interface.

The memory 104 holds GUI typing and mapping logic 110 and a reference GUI type model 112. As will be explained in more detail below, the GUI typing and mapping logic 110 assists the GAP designer to specify GUI element types for individual GUI elements of a GAP. The GUI typing and mapping logic 110 also assists the GAP designer to define links from GUI elements in a current GAP version to GUI elements in a subsequent GAP version. The types and mapping information may be provided to other GAP analysis systems, such as test script analysis systems and metadata repositories, through the communication logic 108.

The system 100 may operate on any particular GUI element. Examples of GUI elements include text boxes, menus, menu items, radio buttons, check boxes, and command buttons. Other examples include list boxes, combo boxes, toggle buttons, spin buttons, scroll bars, labels, tool bars, widgets, images, windows, calendar and tab strips. The reference GUI type model 112 may establish a formalized set of type names (e.g., identifiers) and qualities common to individual GUI elements that distinguish the GUI elements of the same type as members of an identifiable class. The GUI type model 112, in conjunction with specifying types for individual GUI elements, helps to provide a tractable syntactic technique for establishing that the GUI does not exhibit certain behaviors (e.g., storing an alphabetic character in a text box meant to hold a social security number), as opposed to free form ad hoc annotation of GUI elements.

The repository 106 stores graphical user interface application (GAP) GUI element mappings ("mappings") 114. The repository 106 also stores a current GAP version GUI type model 116 and a subsequent GAP version GUI type model 118. The system 100 may prepare the mappings 114 in response to operator input that links GUI elements from any current GAP version to any subsequent GAP version. Thus, for example, if a textbox changes to a drop down list, the operator may document the change by explicitly linking the two GUI elements together. The system 100 responsively prepares an element version mapping and stores the element version mapping in the repository 106.

Similarly, the system 100 may build the type models 116 and 118 from operator specified assignments of GUI element types to specific GUI elements in the current GAP version and the subsequent GAP version. To that end, the system 100 may prompt the operator for a selection from a GUI element type list established by the reference GUI type model 112. Each type model 116 and 118 may include GUI element type specifiers for one or more elements in the current GAP and subsequent GAP. The system 100 may interact with the operator using the display 120, and may also accept command line, script, batch file, and other types of input.

Figure 2:
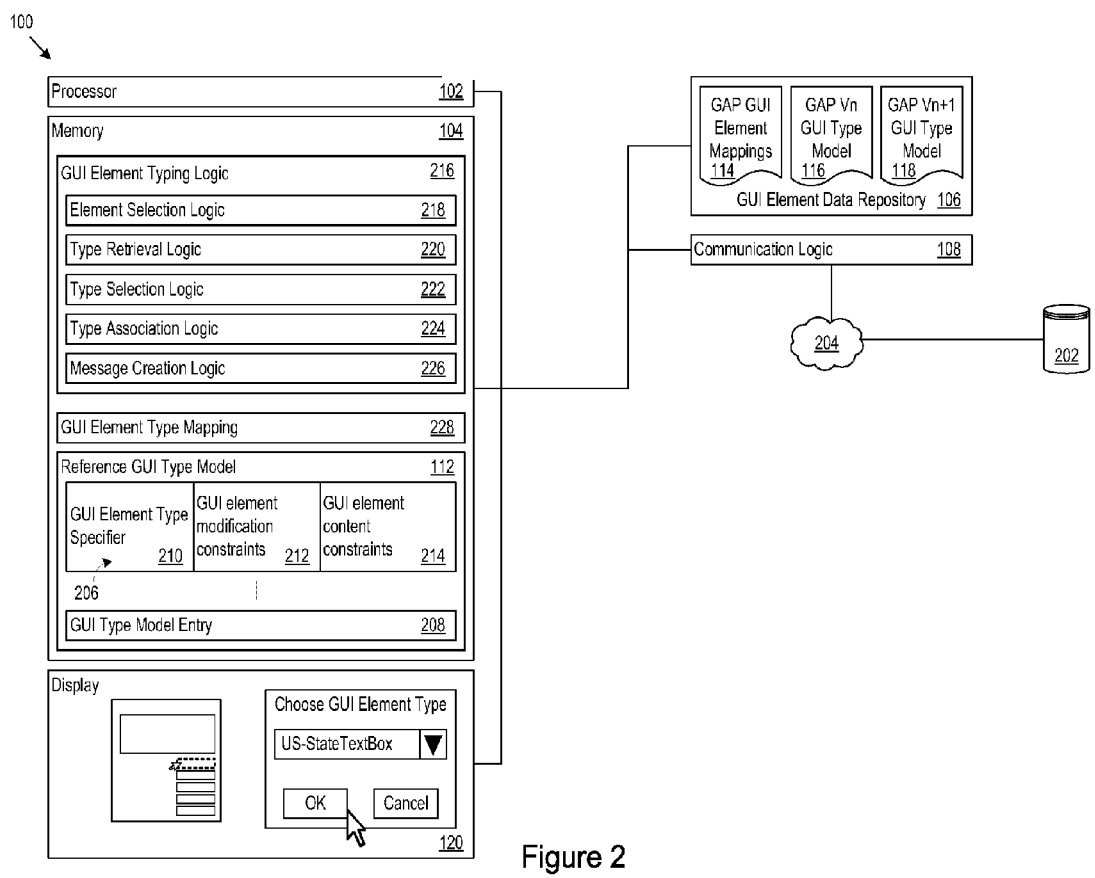
FIG. 2 shows a GUI element typing system.

FIG. 2 shows an implementation of the system 100. FIG. 2 shows that the communication logic 108 may exchange information with the metadata repository 202 through a connection of one or more networks 204. As examples, the system 100 may communicate GUI element type specification messages and GUI element mapping specification messages to the metadata repository 202.

Additional detail of the reference GUI type model 112 is shown in FIG. 2. The reference GUI type model 112 includes GUI type model entries (e.g., the GUI type model entries 206 and 208). The GUI type model entries formally define a type system for a GUI, and may provide a finite set of pre-established identifiers for tagging to GUI elements. Each GUI type model entry may specify a GUI element type specifier 210, GUI element modification constraints 212, and GUI element content constraints 214. In other implementations, the reference GUI type model 112 may include additional, different, or less information. The GUI element type specifier establishes an identifier (e.g., a unique string or number) that may be assigned to a GUI element to specify a GUI element type for the GUI element. The GUI element modification constraints 212 specify how, and if, a GUI element of the type specified may be modified. Similarly, the GUI element content and formatting constraints 214 specify what content a GUI element of the type specified may hold, and how the content, or the GUI element itself may be formatted. The constraints 212 and 214 may be expressed in many ways, such as by rules that dictate desired behavior or constraints on a GUI element of a given type.

Examples of GUI element types are given below in Table 1.

TABLE 1

| GUI Element Type Specifier | GUI Element Modification Constraints | GUI Element Content and Formatting Constraints |
| --- | --- | --- |
| SSNEntryBox | none | Nine digits, or 11 characters of the form: ###-##-#### where # is a digit and '-' is the dash symbol. |
| SSNDisplayBox | ReadOnly | Nine digits, or 11 characters of the form: ###-##-#### where # is a digit and '-' is the dash symbol. |
| StaticWindowLabel | Read Only | 0-50 Alphanumeric characters |
| 3DButton | none | Foreground Color Range: FStart-FEnd Background Color Range: BStart-BEnd |
| HelpTextEntryBox | none | X position range: XMin:XMax Y position range: YMin:YMax FontSize: 10 point minimum 16 point maximum |
| MenuWidget | X, Y location fixed | Minimum Size = SMin Maximum Size = SMax |
| US-StateTextBox | none | Only the names of the States of the United States are permitted. |

In Table 1, the SSNEntryBox specifier may be attached, for example, to a GUI element (e.g., a textbox) in a GAP that is intended for entry of social security numbers. The SSNEntryBox type places no constraints on the modifications that may be performed on the textbox. However, the SSNEntryBox type constrains the content of the textbox to nine digits, or to 3 digits followed by a dash, followed by 2 digits, followed by a dash, followed by 4 digits. The SSNDisplayBox type specifies similar constraints, but also makes the GUI element read only.

The StaticWindowLabel type provides a read only label for its attached GUI element. The label may be between 0 and 50 alphanumeric characters. Because StaticWindowLabel is read only type of GUI element, the label may not be changed.

The 3DButton type limits the foreground colors that may be set for the GUI element to between FStart and FEnd. Similarly, the 3DButton type limits the background colors that may be set for the GUI element to between BStart and BEnd. The HelpTextEntryBox constrains the X and Y position of the attached GUI element, and further constrains the font sized used for the text in the GUI element to between 10 and 16 points. The MenuWidget type may be applied to a graphical button element, for example, to establish the element as a widget for a menu bar. The MenuWidget type fixes the X and Y location of the GUI element, and further establishes a minimum size of SMin and a maximum size of SMax. The US-StateTextBox limits the contents of a GUI element to only the names of the States of the United States (e.g., "Alaska, Maine, Nevada, . . . ").

The system 100 may implement any formal GUI type model 112 useful for assisting a designer to create a GAP. The GUI type model may vary depending on the type of GAP being designed, and the system may choose from multiple GUI type models 112 for the GAP under analysis, or may accept operator input to select which GUI type model is applicable. For example, the operator may specify a healthcare GUI type model when building a pharmacy GAP, and specify a video game GUI type model when building a user interface for an online role playing game. The healthcare GUI type model may include element types useful for building a healthcare related GAP, such as the SSNEntryBox type, while the video game GUI type model may include element types useful for building the user interface, such as 3DButton.

FIG. 2 also shows that the system 100 includes GUI element typing logic ("type mapping logic") 216 residing in the memory 104. The type mapping logic 216 may be included in the GUI typing and mapping logic 110, but may also be a separate module, or implemented in other ways. As described in detail below, the type mapping logic 216 may include element selection logic 218, type retrieval logic 220, and type selection logic 222. The typing logic 216 may further include type association logic 224 and message creation logic 226. The type mapping logic 216 generates GUI element type mappings (e.g., the type mapping 228).

Figure 3:
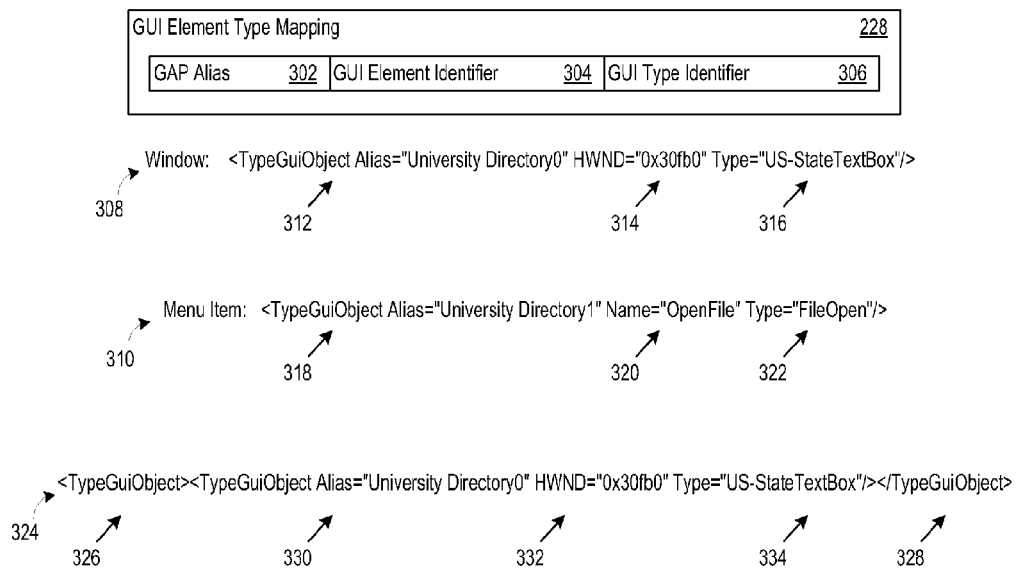
FIG. 3 shows a GUI element type mapping.

Turning briefly to FIG. 3, an example of a GUI element type mapping 300 is shown. The type mapping 300 includes a GAP alias 302, a GUI element identifier 304, and a GUI type identifier 306. Additional, fewer, or different fields may be included in the type mapping 300.

The GAP alias 302 specifies an identifier for the GAP which includes the GUI element to which a type is being applied. The GAP alias 302 may be a unique identifier that distinguishes between GAPs, including a current GAP version and a subsequent version of the same GAP. The GUI element identifier 304 provides a unique identifier for the GUI element which is being typed. The GUI type identifier 306 specifies the GUI element type being assigned to the GUI element (e.g., SSNEntryBox).

FIG. 3 also shows two examples of GUI type mappings 308 and 310. The type mapping 308 is a mapping for a Window GUI element. The GAP alias 312 is "University Directory0", signifying the current version of a university directory GAP. The GUI element being typed has the unique element identifier 314 "0x30fb0" noted by the HWND identifier and established, for example, by an accessibility layer interface as described below.

The GUI type identifier 316 for the Window GUI element is "US-StateTextBox". The type mapping 310 is a mapping for a Menu Item GUI element. The GAP alias 318 is "University Directory1", signifying the subsequent version of the university directory GAP. The GUI element being typed has the unique element identifier 320 "OpenFile" as specified by the Name field. The GUI type identifier 322 for the Window GUI element is "FileOpen".

FIG. 3 also shows an example of a GUI element type specification message 324. The GUI element type specification message 324 may include a GUI element type specification message header 326 and a GUI element type specification message terminator 328. The header 326 and terminator 328 signify that the data within the message specifies a type mapping for a GUI element. To that end, the GUI element type specification message 324 may further include a GAP alias 330, GUI element identifier 332, and a GUI type identifier 334.

Figure 4:
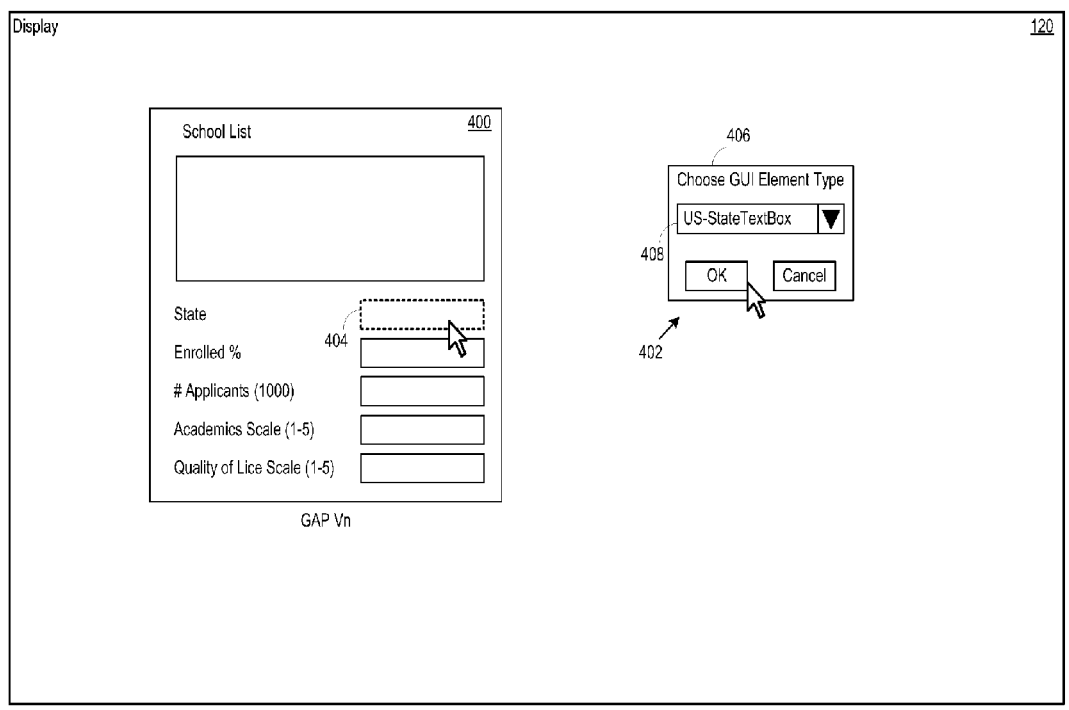
FIG. 4 shows a GUI element type mapping user interface.

FIG. 4 shows a GAP 400 and an example user interface 402 for the typing logic 216. The operator selects GUI elements using, for example, the mouse cursor. When selected, the typing logic 216 highlights the selected GUI element. In the example shown in FIG. 4, the selected GUI element is the textbox 404.

In response to selecting a GUI element, the typing logic 216 displays a type requestor 406. The type requestor 406 provides a drop down list 408 which lists the available GUI element types defined in the reference GUI type model 112. The operator selects an element type to assign to the selected GUI element 404, in this case "US-StateTextBox". Clicking the 'OK' button directs the typing logic 216 to create the mapping of the US-StateTextBox type to the textbox 404. Clicking 'Cancel' directs the typing logic 216 to take no action.

Figure 5:
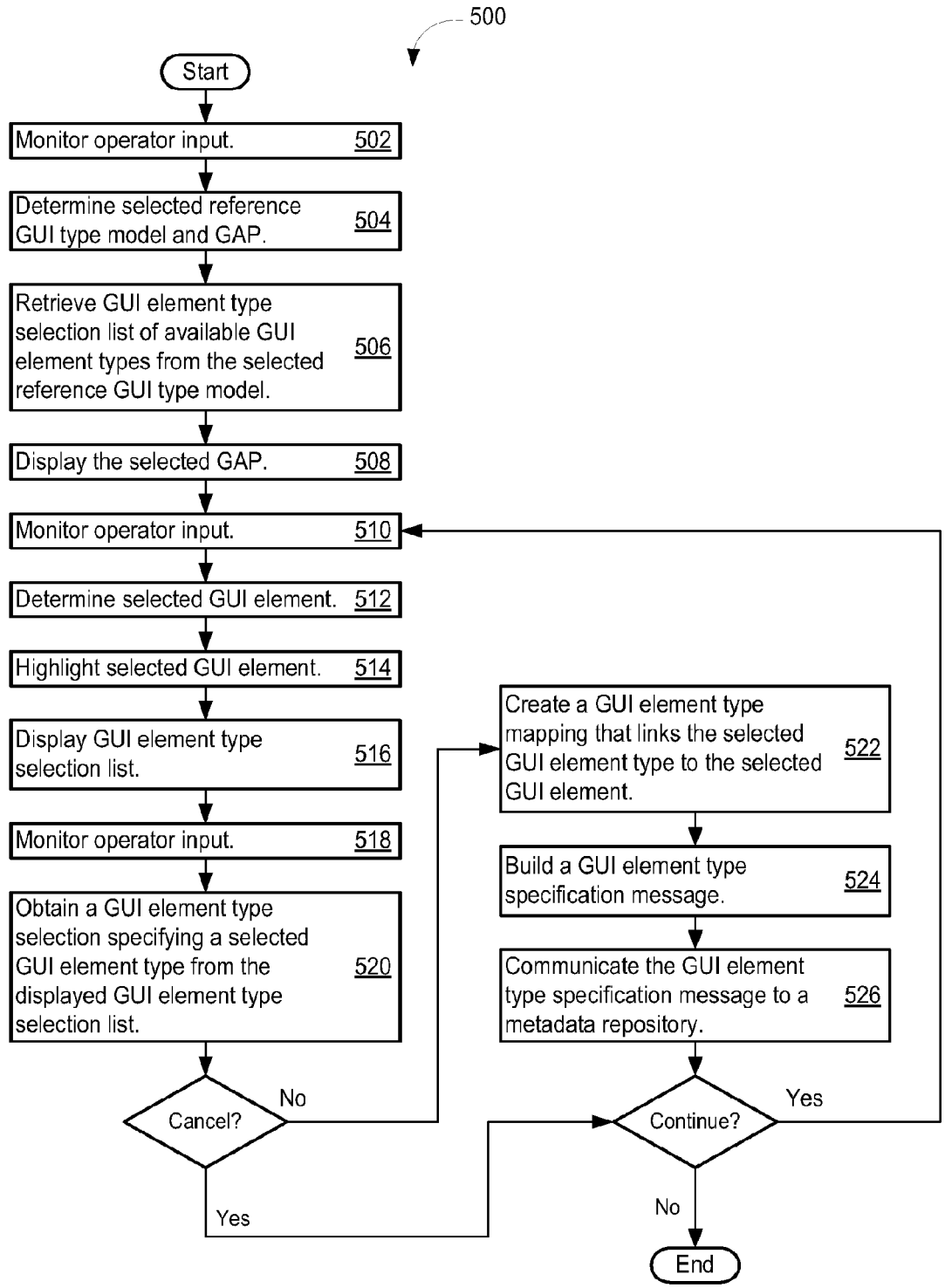
FIG. 5 shows a flow diagram for GUI element typing logic.

FIG. 5 shows a flow diagram 500 of the processing performed by the typing logic 216. The typing logic 216 monitors for operator input (502). In particular, the typing logic 216 uses the operator input to determine a selected reference GUI type model and the GAP that the operator will type (504). For example, the operator may select an applicable reference GUI type model from a list of available reference GUI type models, and may specify the executable program embodying the GAP from a list of known GAPs.

The type retrieval logic 220 retrieves a GUI element type selection list (506) from the selected reference GUI type model. Continuing the example given above in Table 1, the type retrieval logic 220 retrieves the list {SSNEntryBox, SSNDisplayBox, StaticWindowLabel, 3DButton, HelpTextEntryBox, MenuWidget, and US-StateTextBox} from the reference GUI type model. The list contains the permissible GUI element types that the operator may assign to any given GUI element.

The typing logic 216 may also display the selected GAP (508). In one implementation, the typing logic 216 initiates execution of the GAP. The element selection logic 218 then monitors for operator input (510). In particular, the element selection logic 218 monitors for mouse clicks, keyboard input, or other input to determine a selected GUI element (512). The element selection logic 218 highlights the selected GUI element (514). As examples, the element selection logic 218 may draw a border around the element, change the element color, flash the element, or otherwise highlight the selected GUI element.

The type selection logic 222 displays the GUI element type selection list (516). For example, the type selection logic 222 may display the type requestor 406. The type selection logic 222 monitors for operator input (518), such as a drop down list selection of an element type from the GUI element type selection list. In particular, the type selection logic 222 obtains a GUI element type selection that specifies a selected GUI element type from the displayed GUI element type selection list (520).

If the operator accepts the selection, the type association logic 224 creates a GUI element type mapping (522). Specifically, the type association logic 224 creates a mapping that links the selected GUI element type to the selected GUI element. To that end, the type association logic 224 may create a type mapping entry in the GUI type model corresponding to the selected GAP in the repository 124 that specifies a GAP alias field, a GUI element identifier 304 for the selected GUI element, and a GUI type identifier 306 according to the operator selected element type. FIG. 3 gives examples of GUI element type mappings.

In addition, the typing logic 216 may communicate the GUI element type mapping to external systems. To that end, the message creation logic 226 may build a GUI element type specification message (524). The type specification message may include the mapping, a type specification message header, and a type specification message terminator. The message creation logic 226 may also communicate the GUI element type specification message to the metadata repository 202 (526).

Figure 6:
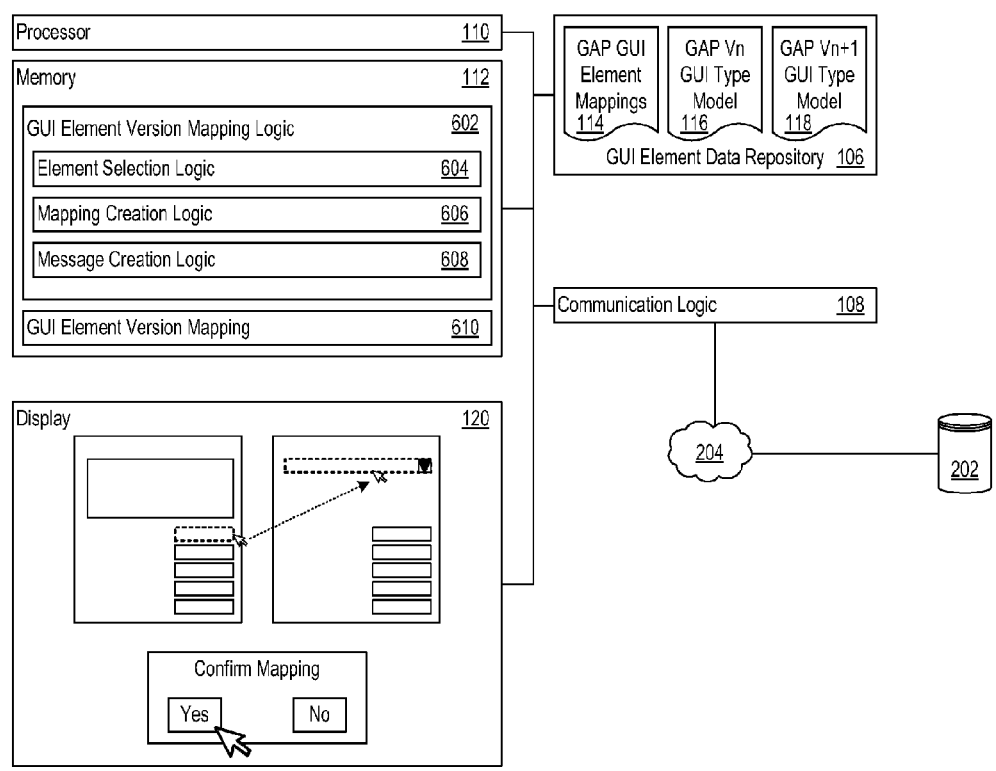
FIG. 6 shows a GUI element mapping system.

FIG. 6 shows an example of the system 100 in which GUI element version mapping logic ("version mapping logic") 602 resides in the memory 104. The version mapping logic 602 may be included in the GUI typing and mapping logic 110, but may also be a separate module, or implemented in other ways. The version mapping logic 602 may include element selection logic 604, mapping creation logic 606, and message creation logic 608. The version mapping logic 602 generates GUI element version mappings (e.g., the version mapping 610).

Figure 7:
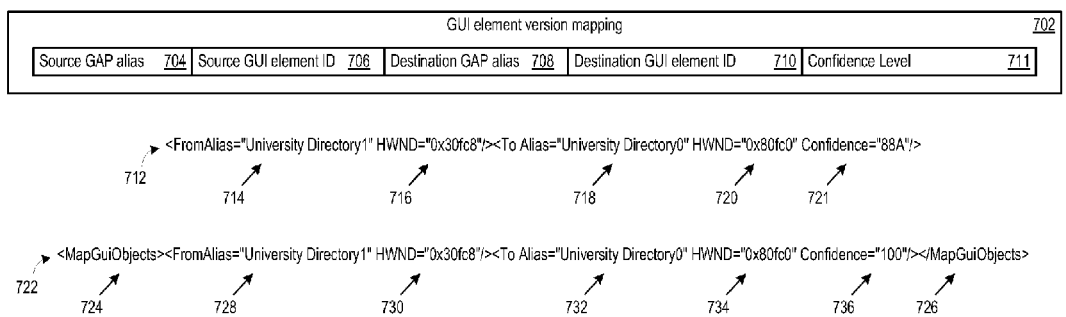
FIG. 7 shows a GUI element version mapping.

FIG. 7 shows an example of the GUI element version mapping ("version mapping") 702. The version mapping 702 includes a source GAP alias 704, a source GUI element identifier 706, a destination GAP alias 708, and a destination GUI element identifier 710. Additional, fewer, or different fields may be included in the version mapping 702.

The source GAP alias 704 specifies an identifier for a GAP (the "source GAP") that includes a first selected GUI element, while the destination GAP alias 708 specifies an identifier for a GAP (the "destination GAP") that includes a second selected GUI element that should be linked to the first selected GUI element. The GAP aliases 704 and 708 may be unique identifiers that distinguish between GAPs, such as identifiers that differentiate the current GAP version and the subsequent GAP version. The source GUI element identifier 706 provides a unique identifier for the selected GUI element in the source GAP, while the destination GUI element identifier 710 provides a unique identifier for the selected GUI element in the destination GAP.

FIG. 7 also shows a specific example of a version mapping 712. The element mapping 712 specifies a source GAP alias 714 of "University Directory1", signifying the subsequent version of a university directory GAP. The source GUI element being mapped (e.g., a combo box), has the unique element identifier 716 "0x30fc0" tagged by a "HWND" label. The element mapping 712 also specifies a destination GAP alias 718 of "University Directory0", signifying the current version of a university directory GAP. The destination GUI element being mapped (e.g., a drop down listbox), has the unique element identifier 720 "0x30fc0" tagged by the "HWND" label. Thus, the version mapping 712 establishes that a particular drop down listbox in the subsequent version of the GAP corresponds to a particular combo box in the current GAP version.

FIG. 7 also shows an example of a GUI element mapping specification message 722. The GUI element mapping specification message 722 may include a GUI element mapping specification message header 724 and a GUI element mapping specification message terminator 726. The header 724 and terminator 726 signify that the data within the message specifies an element mapping between GUI elements in different GAPs. To that end, the GUI element type specification message 722 may further include a source GAP alias 728, a source GUI element identifier 730, a destination GAP alias 732, and a destination GUI element identifier 734.

An optional extension to the GUI element version mapping 702 is the confidence level field 711. The confidence level field 711 may specify a degree of reliability for the GUI element version mapping. When the version mapping arises from the efforts of a human operator, for example, the mapping logic 602 may set the confidence level relatively high (e.g., 90-100%). When the version mapping arises from an automated analysis, the version mapping logic 602 may set the confidence level at a specified level (e.g., a predefined level for automated matching), or may set a threshold that depends on the strength of the automated analysis.

For example, the automated analysis may determine a normalized score for any given attempt to match one GUI element to another GUI element. The confidence level field 711 may then specify the normalized score. The confidence level field 711 may further specify why the confidence level is set to any particular value. Furthermore, an explanation field (e.g., a character such as "M" or "A") may be included in the confidence level field 711 to denote that the confidence level arises from Manual or Automated analysis. An example is the confidence level 721, set to "88A" to denote an automate analysis and a normalized score of 88, while the confidence level 736 shows a confidence value of 100 without specifying an explanation.

Figure 8:
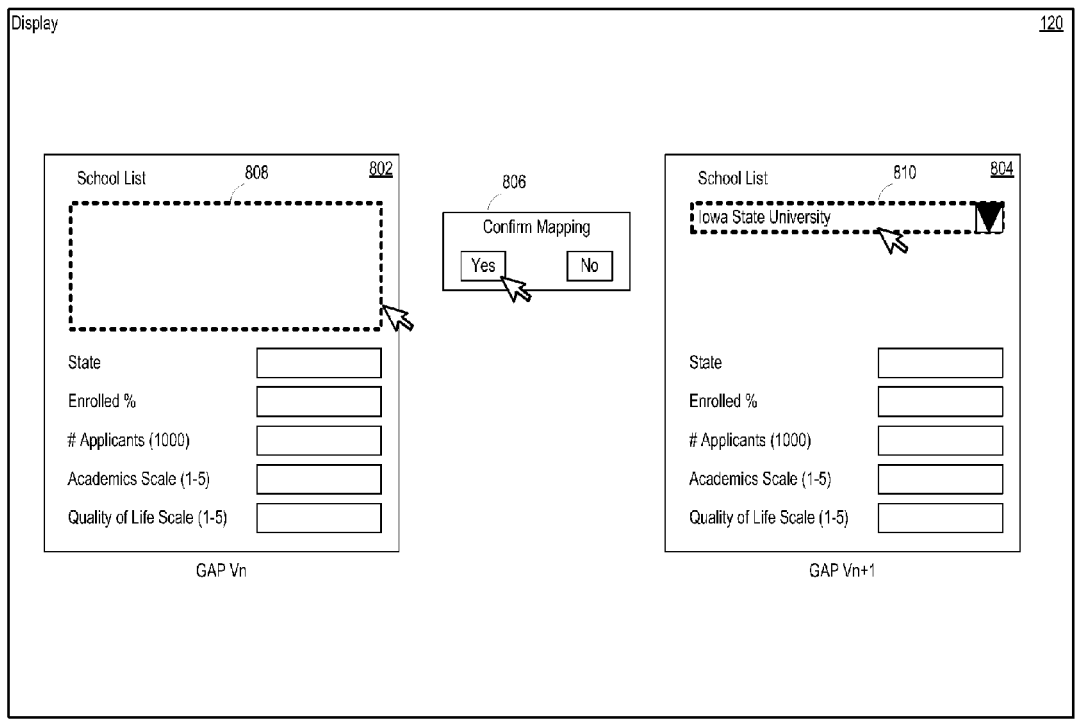
FIG. 8 shows a GUI element version mapping user interface.

FIG. 8 shows a current GAP version 802 and a subsequent GAP version 804, as well as an example mapping user interface 806 for the mapping logic 602. Both GAPs 802 and 804 are shown executing and rendering their GUIs on the display 120. The operator selects GUI elements using, for example, the mouse cursor, keyboard input, or other inputs.

Upon selection, the mapping logic 602 highlights the selected GUI elements. In the example shown in FIG. 8, the selected GUI element in the current GAP version 802 is the list box 808. The selected GUI element in the subsequent GAP version 804 is the drop down list 810. Upon selection of an element in each GAP, the mapping logic 602 displays the mapping user interface 806. Clicking the 'OK' button directs the mapping logic 602 to create the element mapping between the list box 808 and the drop down list 810. Clicking 'Cancel' directs the mapping logic 602 to take no action.

Figure 9:
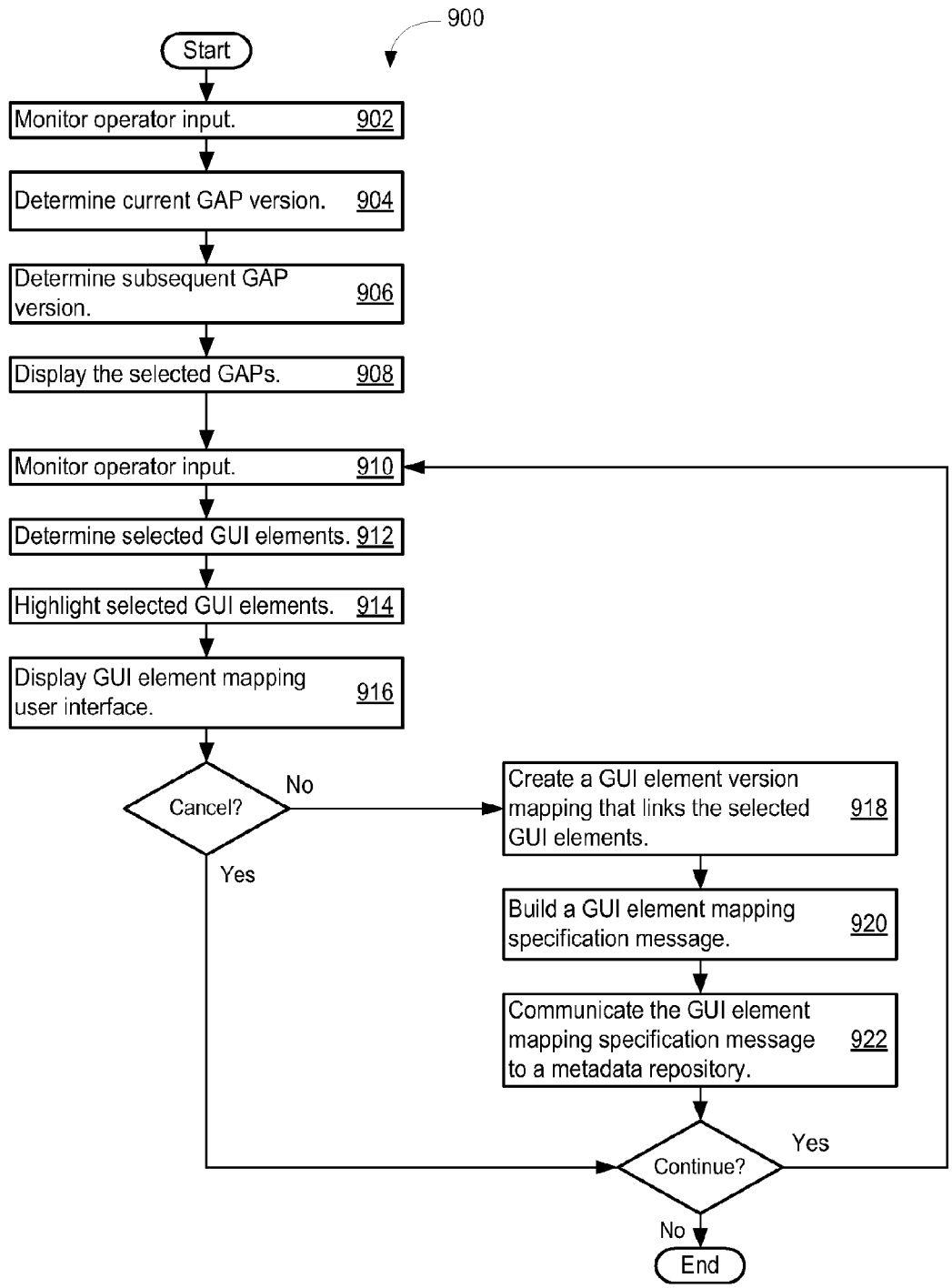
FIG. 9 shows a flow diagram for GUI element version mapping logic.

FIG. 9 shows a flow diagram 900 of the processing performed by the mapping logic 602. The mapping logic 602 monitors for operator input (902) in order to determine a first GAP (904) (e.g., the current GAP version) and a second GAP (906) (e.g., the subsequent GAP version) between which the operator will map individual GUI elements. For example, the operator may select executable program files for the GAPs from a file selection window to choose the two GAPs. The mapping logic 602 displays the GUIs for the selected GAPs (e.g., by executing the GAPs) (908).

The element selection logic 604 then monitors for operator input (910). In particular, the element selection logic 604 detects mouse, keyboard, and other types of input to determine when an operator has selected GUI elements in the GAPs (912). The element selection logic 604 highlights each selected GUI element (914). When a GUI element from each GAP has been selected, the element selection logic 604 displays a GUI element mapping user interface (916). If the operator clicks 'Cancel', the mapping logic 602 need not take any action, but may continue to watch for additional GUI element selections.

If the operator clicks 'OK', the mapping creation logic 606 creates a GUI element version mapping that specifies that a relation exists between the selected GUI elements (918). To that end, the mapping creation logic 606 may store a source GAP alias, a source GUI element identifier corresponding to the selected GUI element in the source GAP, a destination GAP alias, and a destination GUI element identifier corresponding to the selected GUI element in the destination GAP.

Additionally, the message creation logic 608 may build a GUI element mapping specification message (920). To that end, the message creation logic 608 may store a GUI element mapping specification message header and a GUI element mapping specification message terminator. The header and terminator signify that the data within the message specifies a GUI element mapping between GUI elements in different GAPs. The GUI element type specification message may further include a source GAP alias, a source GUI element identifier, a destination GAP alias, and a destination GUI element identifier. The message creation logic 608 may then communication communicate the GUI element mapping specification message to other systems, such as a metadata repository (922).

Figure 10:
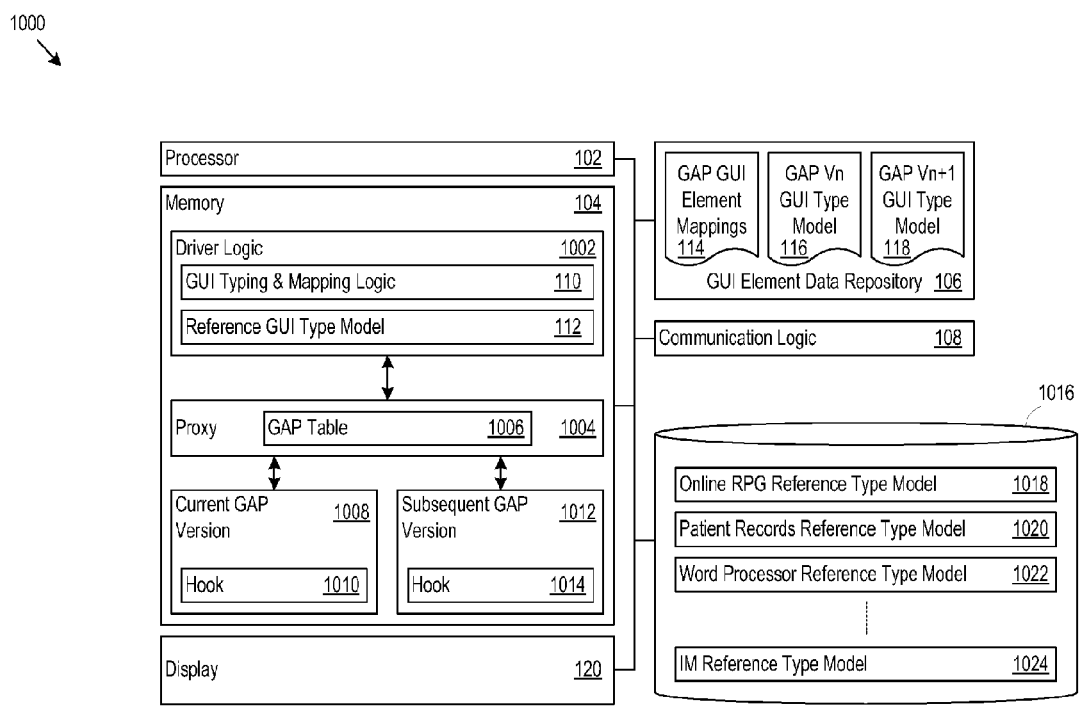
FIG. 10 shows a GUI element typing and mapping system.

FIG. 10 shows an example implementation the GUI element typing and mapping system ("system") 1000. The system 1000 includes driver logic 1002 in the memory 104 as well as a proxy 1004 that accesses a GAP table 1006. In FIG. 10, the current GAP version 1008 is shown executing with a hook 1010, and the subsequent GAP version 1012 is also shown executing with a hook 1014.

The proxy 1004 includes logic that inserts the hooks 1010 and 1014 into the process space of the GAPs 1008 and 1012. The proxy 1004 communicates with the hooks 1010 and 1014. In particular, the proxy 1004 may exchange messages with the hooks 1010 and 1014 to obtain the state of any or all of the GUI elements in the GAPs 1008 and 1012. The hooks 1010 and 1014 are programs that respond to messages from the proxy 1004, and that may interact through an accessibility layer to discover and report information about the GUI elements in the GAPs 1008 and 1012 to the proxy. The operating system generally provides the accessibility layer. The accessibility layer exposes an accessibility interface through which the proxy 1004 and hooks 1010 and 1014 may invoke methods and set and retrieve GUI element values and characteristics, and thereby select, highlight, control, modify, assign identifiers for, or otherwise interact with the GUI elements in the GAPs.

The Microsoft™ Active Accessibility (MSAA) layer is one example of a suitable accessibility layer. In this regard, the GAPs 1008 and 1012 expose the accessibility interfaces that export methods for accessing and manipulating the properties and behavior of GUI elements. For example, the GAPs 1008 and 1012 may employ the IAccessible interface to allow access and control over the GUI element using MSAA API calls. The IAccessible interface further facilitates applications to expose a tree of data nodes that make up each window in the user interface currently being interacted with. The driver logic 1002 and proxy 1004 may then include program statements to access and control the GUI element as if the GUI element was a conventional programming object. Accessibility API calls may include: perform action on object, get value from object, set value on object, navigate to object, and set property on object, and other calls.

The proxy 1004 may be a daemon program and may start prior to the driver logic 1002. The proxy 1004 may be aware of one or more GAPs. When the proxy 1004 starts, it loads the GAP table 1006, which may include a predefined set of GAP entries for which the proxy 1004 is aware. A GAP entry may take the form:

<Alias, <File0, Path0, Dir0, CommandLine0>, <File1, Path1, Dirt CommandLine1>> where Alias is a unique pre-defined name for the GAP (e.g., a name generic to both the current GAP version 1008 and the subsequent GAP version 1012), File0 is the name of the executable program for the current GAP version 1008, Path0 is the absolute path to File0, Dir0 is the absolute path to the directory from which File0 should execute, and CommandLine0 specifies command line arguments for File0. File1, Path1, Dirt and CommandLine1 provide similar parameters for the subsequent GAP version 1012.

When the driver logic 1002 starts, it connects to the Proxy locally or remotely (e.g., through a Transmission Control Protocol (TCP) port). Once connected, the driver logic 1002 requests the GAP table 1006 by sending a GAP table request message to the proxy 1004. The proxy 1004 responds by sending a GAP table response message including the GAP table 1006 to the driver logic 1002. An example message exchange is shown in Table 2:

TABLE 2

GAP table request message
<GetGapTable/>
GAP table response message
<GapTable>
  <GAP Alias = "name"
    <V_N File="gap.exe" Path="c:\path\N" CommandLine="-c1"/>
    <V_N1 File="gap.exe" Path="c:\path\N1" CommandLine="-c1"/>
  </GAP>
</GapTable>

The driver logic 1002 may then provide a list of GAPs to choose from to the operator either for typing the GAP (FIG. 5, (502), (504)) or performing GUI element mapping (FIG. 9, (902), (904), (906)). The driver logic 1102 may then create a GAP load message, e.g., <LoadGap Alias="name"/> and send the GAP load message to the proxy 1004 to start any selected GAP (which will then display its user interface) (FIGS. 5 and 9, (508), (908)). When the operator is performing element mapping, one GAP load message may cause the proxy 1004 to start multiple versions of a GAP identified together in the GAP table 1006 in the <GAP> section.

After starting the GAPs, the proxy 1004 injects hooks into the GAPs' process space. The hook connects to the proxy 1004 and sends a confirmation message (e.g., <GAP File="gap.exe" Instance="192"/>). The proxy 1004 sends a success message (e.g., <Loaded Alias="name" VN="192" VN1="193"/>) to the driver logic 1002, thereby acknowledging that the GAPs are started successfully.

The operator may request the current state of each started GAP from the driver logic 1002. In response, the driver logic 1002 sends a state request message (e.g., <GetState Alias="name"/>) to the proxy 1004. In turn, the proxy 1004 locates the connection to the corresponding hooks of the GAPs and sends a state request message (e.g., <GetState/>) to the hooks. The hooks create a GAP state (including unique identifiers for GUI elements), such as a state tree, encode it (e.g., in XML format), and send it to the proxy 1004. The proxy 1004 forwards the GAP state to the driver logic 1002. An example GAP state message sent by the proxy 1004 is shown in Table 3.

TABLE 3

GAP state message
<State SeqNumber="1" Name="name" Alias="name" ProcessID="972">
    <GUIElement Alias="name">
        <Location x="15" y="200" width="23" height="98"/>
        <Description>Action</Description>
        <DefAction>Action</DefAction>
        <UniqueID>0xcafebabe</UniqueID>
        <Class>LISTBOX</Class>
        <Values>
            <Value SeqNumber="1">someval</Value>
            ...
        </Values>
    </GUIElement>
    ...
</State>

The GAP state contains information about the GUI elements composing a given screen, as well as the values of these elements and their assigned identifiers. The GAP state specifies the GAP GUI elements and the values of the GUI elements. In one implementation the GAP state is reflected in an eXtensible Markup Language (XML) structure where the element 'State' has one or more children elements 'GAP' whose children elements are in turn 'GUIElement's. For example, GUI elements may be either containers or basic. Container GUI elements contain other elements, while basic elements do not contain other elements. The XML structure reflects the containment hierarchy by allowing GUIElements to contain other GUIElements.

In the XML structure, the attribute SeqNumber may designate a unique sequence number of the state within the GAP. Since states are mapped to GUI screens, each state may be given a name which is specified by the optional attribute 'Name'. The attributes Alias and ProcessID may denote the alias of the GAP and its instance process identifier respectively. The instance process identifier may differentiate between the current GAP version and the subsequent GAP version.

The typing and mapping logic 110 may accept operator input (e.g., mouse input) through which the operator identifies a GUI object by pointing the cursor to it (FIGS. 9 and 5, (912) and (512)). The typing and mapping logic 110 may then draw a frame around the element (FIGS. 9 and 5 (914) and (514)). The typing and mapping logic 110 may then display a GUI element type selection list (FIG. 5, (516)) or a GUI element mapping user interface (FIG. 9, (916)). The operator selects the appropriate type for the object (FIG. 5, (520)) or verifies whether a mapping should be created between two selected objects. In either case, the proxy 1004 sends a GUI element type mapping or a GUI element version mapping to the driver logic 1002. In turn, the driver logic 1002 may store the mappings in the repository 106, and may create and communicate a GUI element mapping specification message or a GUI element type specification message to the metadata repository 202 (FIG. 5, (526) and FIG. 9, (922)).

FIG. 10 also shows a reference type model repository 1016. The system 1000 may draw the reference GUI type model 112 currently being applied from one of many different reference type models available in the reference type model repository 1016. The examples shown in FIG. 10 of reference type models include an online role playing game (RPG) reference type model 1018 that may be selected by the operator when designing or typing a GAP that implements online gaming functionality and a patient records reference type model 1020 that the operator may select when designing or typing a healthcare GAP. Additional examples include the word processor reference type model 1022 that the operator may selected when typing or building a word processor GAP, and a Instant Messaging (IM) reference type model 1024 that the operator may select when designing or typing an IM GAP.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A product comprising:
   a computer-readable memory;
   graphical user interface (GUI) type model logic stored on the computer-readable memory and executable by a processor, the GUI type model logic is responsive to selection of a reference GUI type model to use to create a GUI element type mapping;
   builder logic stored on the computer-readable memory and executable by the processor, the builder logic comprising:
   association logic that when executed by the processor creates the GUI element type mapping that links a GUI element type to a GUI element in a GUI;
   message creation logic that when executed by the processor builds a GUI element type specification message that signifies that data within the message specifies a type mapping for a GUI element; and
   communication logic that when executed by the processor causes the processor to communicate the GUI element type specification message with the type mapping for the GUI element to a downstream processing system.

2. The product of claim 1, where the builder logic further comprises:
   element selection logic that when executed by the processor specifies a selected GUI element in a GUI of a GUI application (GAP) by obtaining a GUI element selection; and where the GUI element type mapping comprises:
   a GUI element identifier of the selected GUI element in the GAP; and
   a GUI type identifier of the selected GUI element type.

3. The product of claim 2, where the GUI element type mapping further comprises: a GUI application (GAP) alias.

4. The product of claim 1, where the reference GUI type model is one of multiple GUI type models selectable, where each of the multiple GUI type models comprise: GUI element type specifiers associated with GUI element constraints based on the respective multiple GUI type model.

5. The product of claim 4, where the GUI element constraints comprise: GUI element modification constraints.

6. The product of claim 5, where the GUI element modification constraints comprise: GUI element content constraints.

7. The product of claim 1, where the builder logic further comprises:
   element selection logic that when executed by the processor, obtains a GUI element selection specifying a selected GUI element in a GUI of a GUI application (GAP);
   retrieval logic that when executed by the processor, retrieves, from the reference GUI type model, a GUI element type selection list of available GUI element types; and
   selection logic that when executed obtains a GUI element type selection specifying a selected GUI element type from the GUI element type selection list of available GUI element types.

8. The product of claim 7, where the GUI element type specification message comprises:
   a GUI element type specification message header;
   a GUI element identifier; and
   a GUI type identifier.

9. The product of claim 8, where the GUI element type specification message further comprises: a GUI application (GAP) alias.

10. A system comprising:
    a memory coupled to a processor; and
    mapping logic stored in the memory and executable by the processor, the mapping logic comprising:
    graphical user interface (GUI) type model logic responsive to selection of a current GUI application (GAP) version to use to create a GUI element version mapping, where the current GAP version is a type of GAP from multiple types of GAPs;
    mapping creation logic that when executed by the processor creates the GUI element version mapping that links a source GUI element in the current GAP version to a destination GUI element in a subsequent GAP version based on the type of GAP of the current GAP version;
    message creation logic operable to build a GUI element mapping specification message; and
    communication logic operable to send the GUI element mapping specification message to a downstream processing system.

11. The system of claim 10, where the GUI element version mapping comprises:
    a source GUI element identifier for the source GUI element; and
    a destination GUI element identifier for the destination GUI element.

12. The system of claim 11, where the GUI element version mapping further comprises:
    a source GAP alias for the current GAP version; and
    a destination GAP alias for the subsequent GAP version.

13. The system of claim 11, where the mapping logic further comprises element selection logic that when executed by the processor specifies:
    the source GUI element in the current GAP version by obtaining a source GUI element selection; and
    the destination GUI element in the subsequent GAP version by obtaining a destination GUI element selection.

14. The system of claim 10, where the GUI element mapping specification message comprises:
    a GUI element mapping specification message header;
    a source GUI element identifier for the source GUI element; and
    a destination GUI element identifier for the destination GUI element.

15. A method comprising:
    selecting a current graphical user interface (GUI) application (GAP) version to use to create a GUI element version mapping, where the current GAP version is a type of GAP from multiple types of GAPs;
    creating, in a computer-readable memory using a processor coupled to the memory, the GUI element version mapping that links a source GUI element in the current GAP version to a destination GUI element in a subsequent GAP version based on the type of GAP of the current GAP version;
    building, using the processor coupled to the memory, a GUI element mapping specification message; and
    communicating, using a communications interface, the GUI element mapping specification message to a downstream processing system.

16. The method of claim 15, where creating comprises: creating the GUI element version mapping comprising:
    a source GUI element identifier for the source GUI element; and
    a destination GUI element identifier for the destination GUI element.

17. The method of claim 15, where creating comprises: creating the GUI element version mapping comprising:
    a source GUI element alias for the source GUI element; and
    a destination GUI element alias for the destination GUI element.

18. The method of claim 15, further comprising:
    specifying the source GUI element in the current GAP version by obtaining a source GUI element selection; and
    specifying the destination GUI element in a subsequent GAP version by obtaining a destination GUI element selection.

19. The method of claim 15, where building comprises: building a GUI element mapping specification message including:
    a version mapping message header;
    a source GUI element identifier for the source GUI element; and
    a destination GUI element identifier for the destination GUI element.

20. The method of claim 15, where the subsequent GAP version comprises an economic estimation GAP version including GUI element changes with respect to the current GAP version and specified for cost estimation analysis.

* * * * *